(12) United States Patent
May et al.

(10) Patent No.: US 7,139,616 B2
(45) Date of Patent: *Nov. 21, 2006

(54) REAL-TIME ALERT MECHANISM FOR MONITORING AND CONTROLLING FIELD ASSETS VIA WIRELESS AND INTERNET TECHNOLOGIES

(75) Inventors: James Alan May, Austin, TX (US); Miguel A. Cortes, San Antonio, TX (US); William I. Needel, Austin, TX (US)

(73) Assignee: Isochron, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/119,640

(22) Filed: May 2, 2005

(65) Prior Publication Data

US 2005/0192678 A1    Sep. 1, 2005

Related U.S. Application Data

(63) Continuation of application No. 09/899,527, filed on Jul. 5, 2001, now Pat. No. 6,925,335.

(51) Int. Cl.
*G05B 15/02* (2006.01)

(52) U.S. Cl. .............................. 700/9; 700/65; 700/83; 700/79; 700/231

(58) Field of Classification Search ................ 700/9, 700/65, 83, 79, 80, 81, 82, 241, 237, 244, 700/236, 231; 709/217–219
See application file for complete search history.

(56) References Cited

U.S. PATENT DOCUMENTS

| | | | |
|---|---|---|---|
| 3,784,737 A | 1/1974 | Waehner | 178/6 |
| 4,369,442 A | 1/1983 | Werth et al. | 340/825.35 |
| 4,412,292 A | 10/1983 | Sedam et al. | 364/479 |
| 4,454,670 A | 6/1984 | Bachmann et al. | 40/584 |
| 4,553,211 A | 11/1985 | Kawasaki et al. | 364/479 |
| 4,661,862 A | 4/1987 | Thompson | 358/335 |
| 4,677,565 A | 6/1987 | Ogaki et al. | 364/479 |

(Continued)

FOREIGN PATENT DOCUMENTS

DE    41 40 450 A1    6/1993

(Continued)

OTHER PUBLICATIONS

International Preliminary Examination Report PCT/US01/31381, mailed May 12, 2003.

(Continued)

*Primary Examiner*—Anthony Knight
*Assistant Examiner*—Thomas Pham
(74) *Attorney, Agent, or Firm*—Baker Botts L.L.P.

(57) ABSTRACT

An apparatus and system are disclosed for real-time monitoring and control of field assets. A monitoring device may be coupled to a field asset to determine the occurrence of one or more error conditions. Error conditions may be detected either as they occur or by testing the field asset at timed intervals. Upon detection of one or more error conditions, the monitoring device may initiate one or more corrective sequences to resolve the error condition. Alternatively, the monitoring device may notify a network operations center of the detected error condition. Users may access the network operations center via an Internet-enabled remote device. From the Internet-enabled remote device, the user may view status information concerning one or more field assets. The user may also use the Internet-enabled remote device to instruct the network operations center to issue commands to be executed by the monitoring device such that the error conditions on the field asset may be corrected.

22 Claims, 5 Drawing Sheets

U.S. PATENT DOCUMENTS

| | | | |
|---|---|---|---|
| 4,766,548 A | 8/1988 | Cedrone et al. ............. 364/479 |
| 4,850,009 A | 7/1989 | Zook et al. .................... 379/96 |
| 4,926,996 A | 5/1990 | Eglise et al. ................. 194/212 |
| 4,954,697 A | 9/1990 | Kokubun et al. ........... 235/381 |
| 5,029,098 A | 7/1991 | Levasseur ................... 364/479 |
| 5,077,582 A | 12/1991 | Kravette et al. ............. 355/206 |
| 5,090,589 A | 2/1992 | Brandes et al. ................. 221/2 |
| 5,091,713 A | 2/1992 | Horne et al. ................. 340/541 |
| 5,117,407 A | 5/1992 | Vogel ........................... 369/30 |
| 5,184,179 A | 2/1993 | Tarr et al. .................... 355/206 |
| 5,207,784 A | 5/1993 | Schwartzendruber .......... 221/6 |
| 5,239,480 A | 8/1993 | Huegel ........................ 364/479 |
| 5,255,819 A | 10/1993 | Peckels ........................... 222/1 |
| 5,282,127 A | 1/1994 | Mii ............................... 364/479 |
| 5,337,253 A | 8/1994 | Berkovsky et al. .......... 364/479 |
| 5,339,250 A | 8/1994 | Durbin ........................ 364/479 |
| 5,371,348 A | 12/1994 | Kumar et al. ............... 235/472 |
| 5,386,360 A | 1/1995 | Wilson et al. ............... 364/146 |
| 5,400,246 A | 3/1995 | Wilson et al. ............... 364/146 |
| 5,418,945 A | 5/1995 | Carter et al. ................. 395/600 |
| 5,445,295 A | 8/1995 | Brown ........................... 221/3 |
| 5,505,349 A | 4/1996 | Peckels ........................ 222/641 |
| 5,507,411 A | 4/1996 | Peckels ........................... 222/1 |
| 5,561,604 A | 10/1996 | Buckley et al. ......... 364/479.05 |
| 5,608,643 A | 3/1997 | Wichter et al. ......... 364/479.14 |
| 5,620,079 A * | 4/1997 | Molbak ....................... 194/217 |
| 5,649,308 A | 7/1997 | Andrews ..................... 370/334 |
| 5,671,362 A | 9/1997 | Cowe et al. ................. 395/228 |
| 5,701,252 A | 12/1997 | Facchin et al. .............. 364/479 |
| 5,708,223 A | 1/1998 | Wyss ........................... 73/865.9 |
| 5,769,269 A * | 6/1998 | Peters ............................. 221/7 |
| 5,787,149 A | 7/1998 | Yousefi et al. ................. 379/59 |
| 5,794,144 A | 8/1998 | Comer et al. ................ 455/426 |
| 5,805,997 A | 9/1998 | Farris |
| 5,815,652 A | 9/1998 | Ote et al. .............. 395/183.07 |
| 5,818,603 A | 10/1998 | Motoyama ................... 358/296 |
| 5,822,216 A | 10/1998 | Satchell, Jr. et al. .... 364/479.01 |
| 5,841,866 A | 11/1998 | Bruwer et al. ................. 380/23 |
| 5,842,597 A | 12/1998 | Kraus et al. ............ 221/150 R |
| 5,844,808 A | 12/1998 | Konsmo et al. ......... 364/479.14 |
| 5,850,187 A | 12/1998 | Carrender et al. ...... 340/825.54 |
| 5,860,362 A | 1/1999 | Smith .......................... 101/494 |
| 5,862,517 A | 1/1999 | Honey et al. |
| 5,867,688 A | 2/1999 | Simmon et al. ............. 395/500 |
| 5,892,758 A | 4/1999 | Argyroudis |
| 5,898,904 A | 4/1999 | Wang ......................... 455/31.3 |
| 5,905,442 A | 5/1999 | Mosebrook et al. |
| 5,905,882 A | 5/1999 | Sakagami et al. |
| 5,907,491 A | 5/1999 | Canada et al. ......... 364/468.15 |
| 5,909,183 A | 6/1999 | Borgstahl et al. ...... 340/825.22 |
| 5,915,207 A | 6/1999 | Dao et al. ........................ 455/9 |
| 5,918,213 A | 6/1999 | Bernard et al. ............... 705/26 |
| 5,924,081 A | 7/1999 | Ostendorf et al. ............ 705/30 |
| 5,930,770 A | 7/1999 | Edgar ........................... 705/28 |
| 5,930,771 A | 7/1999 | Stapp ........................... 705/28 |
| 5,941,363 A | 8/1999 | Partyka et al. ............... 194/217 |
| 5,943,042 A | 8/1999 | Siio ............................. 345/172 |
| 5,949,779 A | 9/1999 | Mostafa et al. |
| 5,956,487 A | 9/1999 | Venkatraman et al. |
| 5,957,262 A | 9/1999 | Molbak et al. .............. 194/200 |
| 5,959,536 A | 9/1999 | Chambers et al. |
| 5,959,869 A | 9/1999 | Miller et al. ............... 364/479.1 |
| 5,979,757 A | 11/1999 | Tracy et al. ................. 235/383 |
| 5,982,325 A | 11/1999 | Thornton et al. ....... 342/357.07 |
| 5,982,652 A | 11/1999 | Simonelli et al. ........... 363/142 |
| 5,986,219 A | 11/1999 | Carroll et al. ................... 177/1 |
| 5,991,749 A | 11/1999 | Morrill, Jr. .................. 705/44 |
| 5,997,170 A | 12/1999 | Brodbeck ................ 364/479.06 |
| 6,003,070 A * | 12/1999 | Frantz .......................... 709/206 |
| 6,005,850 A | 12/1999 | Moura et al. ................ 370/282 |
| 6,012,041 A | 1/2000 | Brewer et al. ................. 705/28 |
| 6,021,324 A | 2/2000 | Sizer, II et al. |
| 6,021,437 A | 2/2000 | Chen et al. ................... 709/224 |
| 6,029,143 A | 2/2000 | Mosher et al. ................. 705/28 |
| 6,032,202 A | 2/2000 | Lea et al. |
| 6,038,491 A | 3/2000 | McGarry et al. ........... 700/231 |
| 6,052,667 A | 4/2000 | Walker et al. ................. 705/15 |
| 6,052,750 A | 4/2000 | Lea ............................... 710/72 |
| 6,056,194 A | 5/2000 | Kolls ........................... 235/381 |
| 6,057,758 A | 5/2000 | Dempsey et al. ............ 340/539 |
| 6,061,668 A | 5/2000 | Sharrow ...................... 705/400 |
| 6,068,305 A | 5/2000 | Myers et al. ................. 292/201 |
| 6,070,070 A | 5/2000 | Ladue ......................... 455/419 |
| 6,072,521 A | 6/2000 | Harrison et al. ............... 348/12 |
| 6,084,528 A | 7/2000 | Beach et al. ........... 340/825.35 |
| 6,085,888 A | 7/2000 | Tedesco et al. .............. 194/217 |
| 6,119,100 A | 9/2000 | Walker et al. ................. 705/20 |
| 6,124,800 A | 9/2000 | Beard et al. ............ 340/825.35 |
| 6,131,399 A | 10/2000 | Hall ............................... 62/127 |
| 6,161,059 A | 12/2000 | Tedesco et al. .............. 700/232 |
| 6,163,811 A | 12/2000 | Porter .......................... 709/247 |
| 6,181,981 B1 | 1/2001 | Varga et al. ................. 700/236 |
| 6,185,545 B1 | 2/2001 | Resnick et al. ................ 705/40 |
| 6,199,753 B1 | 3/2001 | Tracy et al. ................. 235/375 |
| 6,230,150 B1 | 5/2001 | Walker et al. |
| 6,272,395 B1 | 8/2001 | Brodbeck ..................... 700/236 |
| 6,289,453 B1 | 9/2001 | Walker et al. ............... 713/175 |
| 6,304,895 B1 | 10/2001 | Schneider et al. ........... 709/203 |
| 6,324,520 B1 | 11/2001 | Walker et al. ................. 705/16 |
| 6,338,149 B1 | 1/2002 | Ciccone, Jr. et al. .......... 714/38 |
| 6,339,731 B1 | 1/2002 | Morris et al. ................ 700/236 |
| 6,341,271 B1 | 1/2002 | Salvo et al. ................... 705/28 |
| 6,356,794 B1 | 3/2002 | Perin, Jr. et al. .............. 700/78 |
| 6,385,772 B1 | 5/2002 | Courtney ..................... 725/105 |
| 6,434,534 B1 | 8/2002 | Walker et al. ................. 705/14 |
| 6,437,692 B1 | 8/2002 | Petite et al. .................. 340/540 |
| 6,442,532 B1 | 8/2002 | Kawan ......................... 705/35 |
| 6,457,038 B1 | 9/2002 | Defosse ....................... 709/200 |
| 6,462,644 B1 | 10/2002 | Howell et al. .............. 340/5.92 |
| 6,467,685 B1 | 10/2002 | Teicher ........................ 235/379 |
| 6,502,131 B1 | 12/2002 | Vaid et al. ................... 709/224 |
| 6,505,095 B1 | 1/2003 | Kolls ........................... 700/244 |
| 6,525,644 B1 | 2/2003 | Stillwagon .................. 340/5.61 |
| 6,550,672 B1 | 4/2003 | Tracy et al. ................. 235/383 |
| 6,553,336 B1 | 4/2003 | Johnson et al. .............. 702/188 |
| 6,581,986 B1 | 6/2003 | Roatis et al. ................. 292/199 |
| 6,584,309 B1 | 6/2003 | Whigham .................... 455/414 |
| 6,604,086 B1 | 8/2003 | Kolls ............................. 705/14 |
| 6,604,087 B1 | 8/2003 | Kolls ............................. 705/14 |
| 6,606,602 B1 | 8/2003 | Kolls ............................. 705/14 |
| 6,606,605 B1 * | 8/2003 | Kolls ............................. 705/26 |
| 6,609,113 B1 | 8/2003 | O'Leary et al. ............... 705/39 |
| 6,615,623 B1 | 9/2003 | Ormerod ....................... 70/224 |
| 6,695,166 B1 | 2/2004 | Long ............................ 221/14 |
| 6,704,714 B1 | 3/2004 | O'Leary et al. ............... 705/39 |
| 6,712,266 B1 | 3/2004 | Bartley et al. ............... 235/380 |
| 6,714,977 B1 | 3/2004 | Fowler et al. ............... 709/224 |
| 6,735,830 B1 | 5/2004 | Gelvin et al. ................ 709/224 |
| 6,738,811 B1 | 5/2004 | Liang .......................... 709/224 |
| 6,748,296 B1 | 6/2004 | Banerjee et al. ............. 700/241 |
| 6,751,562 B1 | 6/2004 | Blackett et al. ............... 702/61 |
| 6,754,558 B1 | 6/2004 | Preston et al. ............... 700/236 |
| 6,772,048 B1 | 8/2004 | Leibu et al. ................. 700/241 |
| 6,826,607 B1 | 11/2004 | Gelvin et al. ................ 709/224 |
| 6,832,251 B1 | 12/2004 | Gelvin et al. ................ 709/224 |
| 6,837,436 B1 | 1/2005 | Swartz et al. ........... 235/472.02 |
| 6,844,813 B1 | 1/2005 | Hardman .................... 340/539.1 |
| 6,850,252 B1 | 2/2005 | Hoffberg .................... 346/718 |
| 6,859,831 B1 | 2/2005 | Gelvin et al. ................ 709/224 |
| 6,867,685 B1 | 3/2005 | Stillwagon .................. 340/5.64 |
| 6,876,988 B1 | 4/2005 | Helsper et al. ................ 706/21 |
| 6,900,720 B1 | 5/2005 | Denison et al. .............. 340/5.9 |
| 6,925,335 B1 * | 8/2005 | May et al. ...................... 700/9 |
| 6,959,266 B1 | 10/2005 | Candela et al. .............. 702/186 |

| | | | |
|---|---|---|---|
| 6,973,475 B1 | 12/2005 | Kenyon et al. | 709/203 |
| 2001/0002210 A1 | 5/2001 | Petite | 379/155 |
| 2001/0054083 A1 | 12/2001 | Defosse | 709/217 |
| 2002/0016829 A1 | 2/2002 | Defosse | 709/217 |
| 2002/0024420 A1 | 2/2002 | Ayala et al. | 340/5.61 |
| 2002/0169539 A1 | 11/2002 | Menard et al. | 701/200 |
| 2002/0194387 A1 | 12/2002 | Defosse | 709/251 |
| 2003/0013482 A1 | 1/2003 | Brankovic | 455/553 |
| 2003/0097474 A1 | 5/2003 | Defosse et al. | 709/246 |
| 2003/0101257 A1 | 5/2003 | Godwin | 709/223 |
| 2003/0101262 A1 | 5/2003 | Godwin | 709/224 |
| 2003/0128101 A1 | 7/2003 | Long | 340/5.26 |
| 2003/0204391 A1 | 10/2003 | May et al. | 704/8 |
| 2004/0207509 A1 | 10/2004 | Mlynarczyk et al. | 340/5.23 |
| 2005/0161953 A1 | 7/2005 | Roatis et al. | 292/199 |
| 2005/0179544 A1 | 8/2005 | Sutton et al. | 340/543 |

FOREIGN PATENT DOCUMENTS

| | | | |
|---|---|---|---|
| EP | 0 564 736 A1 | | 10/1993 |
| EP | 0 602 787 A2 | | 10/1993 |
| EP | 0 817 138 A1 | | 1/1998 |
| EP | 0 999 529 | | 5/2000 |
| EP | 1096408 | | 5/2001 |
| FR | 2 744 545 | | 2/1996 |
| FR | 2 755776 | | 5/1998 |
| JP | 04253294 A | * | 9/1992 |
| JP | 6296335 A2 | | 10/1994 |
| JP | 9198172 A2 | | 7/1997 |
| JP | 10105802 A | * | 4/1998 |
| WO | WO 89/07807 | | 8/1989 |
| WO | WO 95/04333 | | 2/1995 |
| WO | WO 95/05609 | | 2/1995 |
| WO | WO 97/09667 | | 3/1997 |
| WO | WO 98/45779 | | 10/1998 |
| WO | WO 99/23620 | | 5/1999 |
| WO | WO 99/27465 | | 6/1999 |
| WO | WO 99/36751 | | 7/1999 |
| WO | WO 99/48065 | | 9/1999 |
| WO | WO 00/04475 | | 1/2000 |
| WO | WO 00/04476 | | 1/2000 |
| WO | WO 00/31701 | | 6/2000 |
| WO | WO 02/19281 | | 3/2002 |

OTHER PUBLICATIONS

International Search Report for PCT/US99/05983 7 pages (064814.0107), Mailed Aug. 13, 1999.

International Search Report PCT US 01/41640, Aug. 21, 2002.

International Search Report PCT/US 01/31381 (064814.0209), Mailed Nov. 7, 2002.

International Search Report PCT/US01/15522, Mailed May 16, 2002.

International Search Report PCT/US01/16749 (064814.0145), Mailed Dec. 20, 2001.

American Power Conversion Internet Article, "Lightning Advisor", at internet, <http://lightning.apcc.com>, Printed May 10, 2000.

American Products Internet Article, "Product Information", at internet, <http://www.apc.com>, Printed May 10, 2000.

Left high and dry? Sold-out machine sends for Cokes; Nashville Banner, Aug. 16, 1995.

Leitch, Carolyn, "Coke machines signal when it's time for a refill"; The Globe & Mail, Toronto, Ontario, Aug. 30, 1995.

Meet the Smart Coke Machine; The Sacramento Bee Buisness Technology; Wednesday, Aug. 30, 1995.

NetBotz Internet Article, "Welcome to Netbotz" at internet <http:www.netbotz.com>, Printed May 10, 2000.

Skywire allows vendor tracking of pop stock and sales details; RCR, vol. 14, No. 17., Sep. 4, 1995.

Skywire Provides Details of Wireless 'VendView' System; Vending Times, Sep., 1994.

Wireless Communications Forum; vol. III, No. 1 pp. 25-30, Apr. 1995.

International Search Report PCT/US 03/37776, mailed May 17, 2004.

Pending U.S. Appl. No. 09/853,366, entitled *Method and System for the Optimal Formatiing, Reduction and Compression of DEX/UCS Data* filed May 11, 2001 by Defosse et al., May 11, 2001.

Pending U.S. Appl. No. 09/862,891, entitled *System and Apparatus for the Remote Monitoring and Control of a Computing Component-* Filed May 22,-2001 by Erin M. Defosse, May 22, 2001.

Pending U.S. Appl. No. 09/895,647, entitled *Method and System for Interfacing a Machine Controller and a Wireless Network* filed Jun. 29, 2001 by Defosse et al., Jun. 29, 2001.

BT redcare Telemetry Vending Interface Unit (VIU), Antronics Ltd Case Study, <http:www.antronic.co.uk/portfolio/viu>, 4 pgs.

Maxim/Dallas, "What is an iButton?" at internet http://www.maxim-ic.com/products/ibutton/ibuttons/, 3 pages.

* cited by examiner

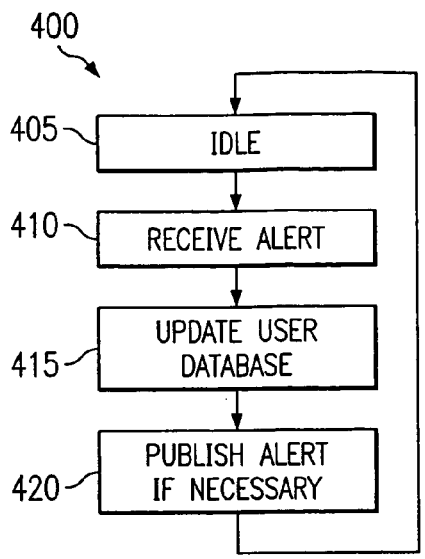
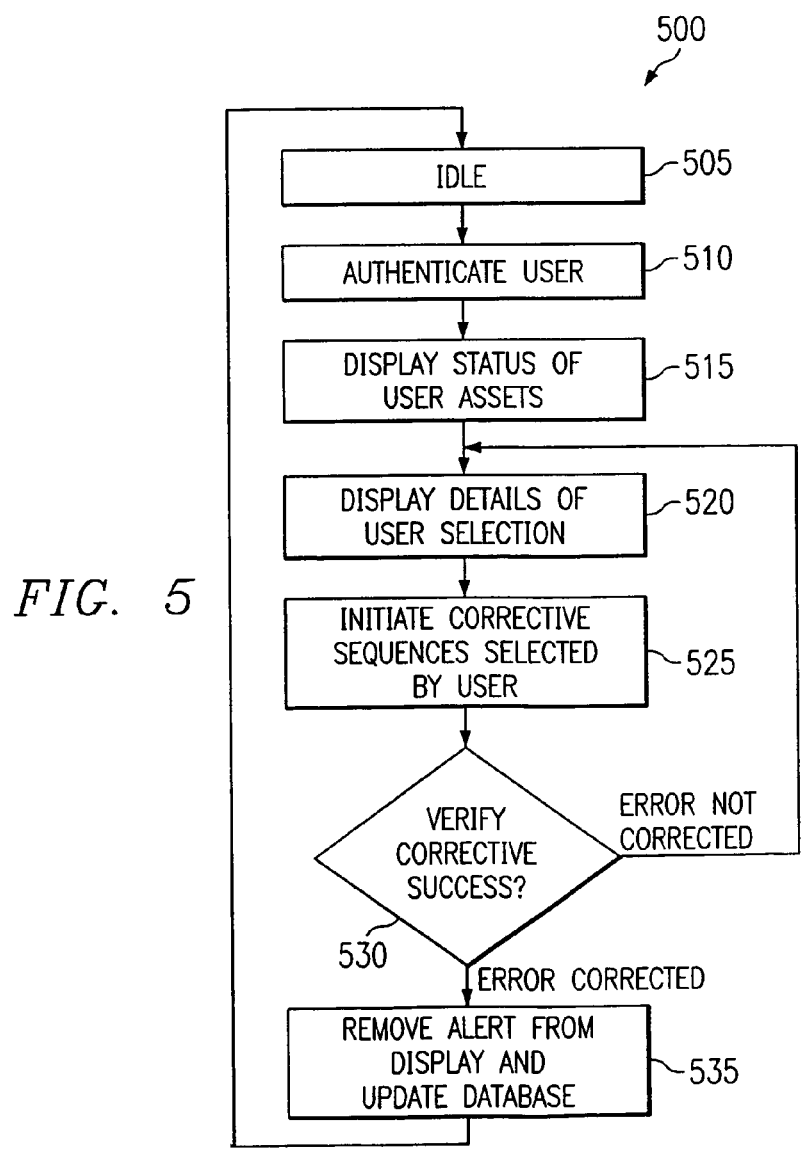
FIG. 4
FIG. 5

REAL-TIME ALERT MECHANISM FOR MONITORING AND CONTROLLING FIELD ASSETS VIA WIRELESS AND INTERNET TECHNOLOGIES

CROSS-REFERENCE TO RELATED APPLICATIONS

This application is a continuation of U.S. patent application Ser. No. 09/899,527 entitled "Real-Time Alert Mechanism for Monitoring and Controlling Field Assets Via Wireless and Internet Technologies" filed on Jul. 5, 2001, now U.S. Pat. No. 6,925,335.

TECHNICAL FIELD

The present invention relates generally to field asset monitoring and control. More particularly, the present invention relates to a system and apparatus for the real-time monitoring and control of field assets using wireless and Internet technologies.

BACKGROUND

Businesses in which the assets responsible for the generation of revenues are dispersed over wide geographic regions have existed for many years. For example, a vending machine operator may have hundreds of vending machines located at schools, office buildings, etc. across a large metropolitan area. Similarly, many oil companies are known to own and operate numerous oil wells located amongst multiple states if not also across multiple continents.

Managing such dispersed field assets generally requires a significant amount of resources. Typically, a technician travels a service route that takes him to each of the vending machines in the vending business operator's network. Such a service method may have the technician returning to a vending machine only once every month. As such, great expenditures of time and money are likely to be incurred in order to effect proper maintenance of each of the field assets.

In addition to the significant resources needed to effectively manage such distributed asset businesses, there also exists a substantial risk for lost revenues. For example, if a field asset becomes disabled shortly after a technician visit, it may be some time before the technician returns to the disabled asset to discover and render the needed repairs. During the down time of the field asset, no revenues can be generated by the disabled asset. Similarly, if a vending machine should deplete its inventory, that vending machine will not be able to generate revenues until a technician returns and restocks the inventory.

SUMMARY OF THE INVENTION

In accordance with teachings of the present invention, a system and apparatus are described for using wireless and Internet technologies for the real-time monitoring and control of field assets.

In one aspect of the present invention, an apparatus for managing a field asset is provided. The apparatus preferably includes memory coupled to at least one processor. The apparatus preferably further includes a communications interface coupled to the processor and the memory that is operable to communicate with a controller board coupled to the field asset. A program of instructions, storable in the memory and executable in the processor, operable to correct one or more error conditions and further operable to package uncorrected error conditions for transmission is also preferably included in the apparatus. A wireless network interface may also be included and is preferably coupled to the memory and the processor. The wireless network interface may be employed to transmit the packaged error conditions to a network operations center via a wireless network.

In yet another aspect of the present invention, a system for the Internet enabled management of a field asset is provided. The system preferably includes a field asset having a controller board operable to detect at least one error condition and a monitoring device coupled to the field asset. The monitoring device preferably includes a processor, memory coupled to the processor, a communications interface coupled to the processor, the memory and the controller board as well as a wireless network interface coupled to the memory and the processor. The communications interface of the monitoring device is preferably operable to communicate with the field asset as well as a wireless network. The system preferably further includes a network operations center coupled to the wireless network. The network operations center is preferably operable to receive alerts indicative of error conditions occurring on the field asset from the monitoring device. In addition, the network operations center is preferably operable to display at least one entry indicative of an error condition existing on the field asset via an Internet enabled remote device.

One technical advantage provided by the present invention is the ability to remotely evaluate field asset performance.

Another technical advantage provided by the present invention is the ability to manage an asset from a remote device such as a two-way pager, mobile phone, PDA (personal digital assistant), computer or similar device.

Yet another technical advantage provided by the present invention is the ability to decrease field asset downtime through the real-time notification of field asset maintenance needs.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 4 is a flow diagram illustrating a method for updating a field asset status database according to teachings of the present invention;

FIG. 5 is a flow diagram illustrating a method for displaying field asset status to an authorized user via an Internet enabled remote device according to teachings of the present invention.

DETAILED DESCRIPTION

Figure 1:
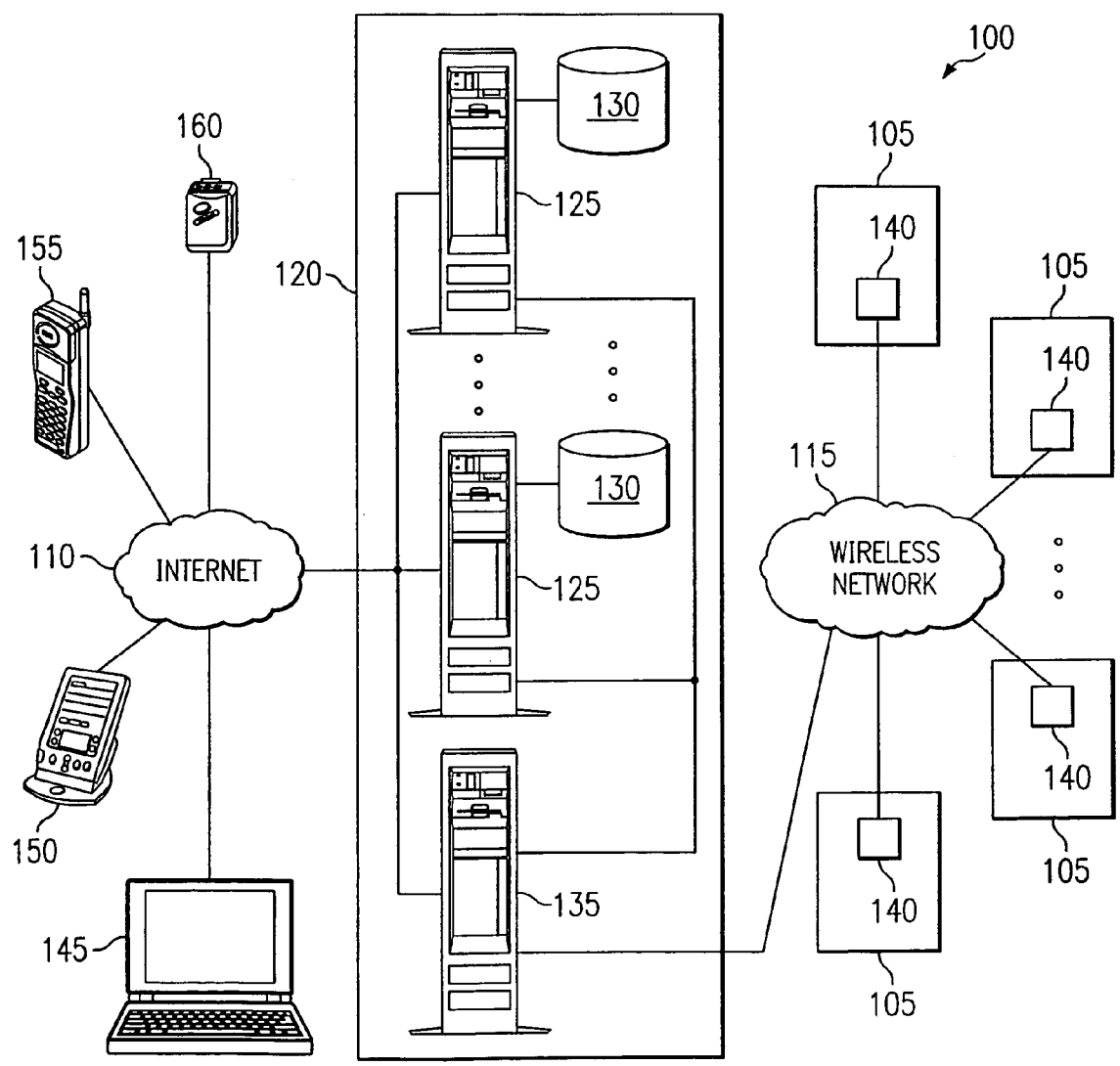
FIG. 1 is a schematic drawing illustrating a field asset management system according to teachings of the present invention.

Preferred embodiments of the present invention and its advantages are best understood by referring to FIGS. 1–7 of the drawings, like numerals being used for like and corresponding parts of the various drawings. Referring first to FIG. 1, a schematic drawing illustrating a field asset management system incorporating teachings of the present invention is shown. System 100 of FIG. 1 illustrates one way in which a plurality of field assets 105 may be monitored, managed or otherwise manipulated using Internet 110 and wireless network 115 technologies. Preferably facilitating communications between field assets 105 and one or more Internet-enabled devices attached to Internet 110 is network operations center (NOC) 120.

NOC 120 may include one or more server systems 125 as well as one or more storage devices 130 to provide access to information associated with field assets 105. NOC 120 may also employ communications server 135 to receive information from and transmit information to wireless network 115 as well as to receive information from and transmit information to Internet 110. One or more server systems 125 may be coupled to communications server 135 directly and/or through Internet 110.

As depicted in FIG. 1, NOC 120 is preferably operable to receive and transmit communications or information via wireless network 115 and Internet 110. Information that may be communicated to NOC 120 may include, but is not limited to, alerts transmitted by monitoring device 140 coupled to field asset 105, one or more control instructions transmitted by a remote device and other information. In addition, NOC 120 may transmit control signals or instructions to monitoring device 140 operable to initiate testing of field asset 105 or to otherwise manage and control field asset 105. NOC 120 may also be employed to transmit information regarding the status of field asset 105 to a remote device or other desired destination.

As mentioned above, field asset 105 preferably includes monitoring device 140. Monitoring device 140 preferably employs a wireless technology solution to communicate alerts indicative of error conditions existing on field asset 105 to NOC 120. Monitoring device 140 is preferably further operable to receive control instructions from NOC 120. Monitoring device 140 preferably employs wireless network 115 for communication with NOC 120.

In one embodiment of the present invention, monitoring device 140 may be designed to poll field asset 105 to determine whether an error condition is present on field asset 105. Alternatively, monitoring device 140 may be informed of error conditions on field asset 105 by technologies included in field asset 105 notifying monitoring device 140 of the presence of the error condition's occurrence. As will be described in greater detail below, monitoring device 140 may also include the ability to address specific error conditions that occur on field asset 105. For those error conditions monitoring device 140 is not operable to correct, monitoring device 140 is preferably configured to package the uncorrected error conditions into an alert to be transmitted to NOC 120 via wireless network 115.

To provide authorized users with remote access to field asset 105 status, NOC 120 preferably updates one or more database entries on storage device 130 upon receipt of an alert from monitoring device 140. By updating the entries associated with individual field assets 105, a user, preferably via Internet 110, may connect to NOC 120 and view the current status of each field asset 105.

A user may employ a variety of user interface devices to connect to NOC 120. For example, a user may access NOC 120 via Internet 110 using computer 145, personal digital assistant (PDA) 150, mobile phone 155, pager 160 or a similarly equipped device. Other user interfaces may be used and are considered within the scope of the present invention.

In one embodiment, monitoring device 140 may be a generally self-contained unit employed to retro-fit an existing field asset 105 to accomplish teachings of the present invention. Alternatively, monitoring device 140 may be designed such that existing technologies within field asset 105 are leveraged, i.e., by adding application and control software as well as wireless communications hardware. Other monitoring device 140 designs and configurations are contemplated and are to be considered within the scope of the present invention.

Figure 2:
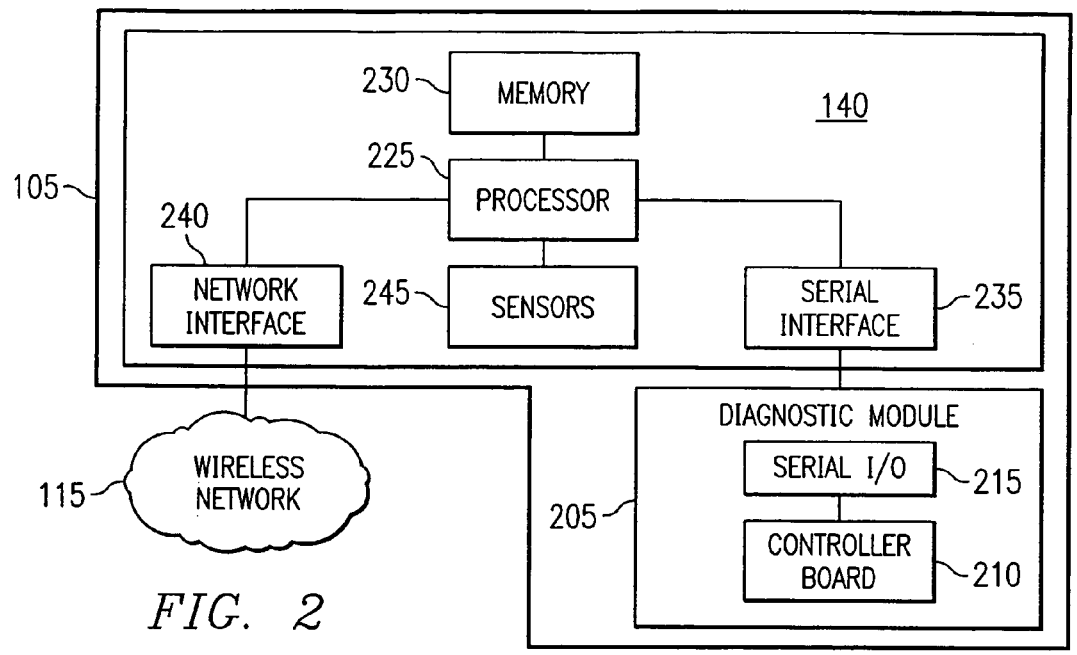
FIG. 2 is a schematic drawing with portions cut away illustrating one embodiment of a monitored field asset according to teachings of the present invention.

Referring now to FIG. 2, a schematic drawing with portions cut away illustrating a field asset 105 employing one embodiment of a monitoring device 140 configured to leverage the existing technologies of field asset 105 is shown according to teachings of the present invention. In FIG. 2, field asset 105 has been manufactured to include diagnostic module 205. Diagnostic module 205 is generally employed by a service technician when physically located at field asset 105.

Diagnostic module 205 is preferably operable to identify a variety of error conditions that can occur on field asset 105. In response to the identification of an error condition, diagnostic module 205 preferably generates a visible signal, such as one or more illuminated LEDs (light emitting diode), a message on a LCD (liquid crystal display), etc. to indicate to a service technician the source of the error condition.

Diagnostic module 205 preferably includes controller board 210 and serial I/O (input/output) 215. Controller board 210 is generally configured to monitor a variety of aspects or characteristics of field asset 105. For example, if field asset 105 is an ice bagging machine, controller board 210 may be configured to monitor such aspects as vend quantities, amount of change remaining in the machine, amount of sales, operation of cooling hardware, icebox temperature, etc. and further configured to generate an indicator in the event of an error condition associated with one or more of the monitored aspects. Serial I/O 215 is typically incorporated into diagnostic module 205 to allow a technician servicing field asset 105 to connect a diagnostic tool thereto. The diagnostic tool is commonly employed to download the current status of field asset 105 for use by the servicing technician.

As illustrated in FIG. 2, field asset 105 preferably includes monitoring device 140 contained therein. Monitoring device 140 of FIG. 2 preferably includes central processing unit (CPU) 225, memory 230, serial interface 235 and communications network interface 240. Monitoring device 140 of FIG. 2 preferably leverages the capabilities and functionalities of diagnostic module 205 by being operable to communicate with diagnostic module 205 via serial I/O 215. One or more sensors 245 may also be incorporated into monitoring device 140 to allow monitoring device 140 to measure one or more characteristics of field asset 105 not monitored by diagnostic module 205.

In a preferred embodiment of the present invention, monitoring device 140 is capable of storing and executing its own software. In such an embodiment, a program of instructions may be programmed in memory 230 enabling monitoring device 140 to poll diagnostic module 205 at timed intervals, or on command, to determine whether any error conditions are present on field asset 105. For example, the software may be enabled to instruct controller board 210 to test the integrity of various hardware components of field asset 105, to notify NOC 120 or remote device 125 in the event of an error condition, to access measurements taken by sensors 245 as well as to monitor and control other characteristics associated with field asset 105. In addition, a program of instructions enabling monitoring device 140 to correct specified error conditions on field asset 105 may also be programmed into memory 230. For example, monitoring device 140 may be programmed to reset various aspects of field asset 105, change to a maintenance mode as well as perform corrective measures.

In addition, management software may also be included on monitoring device 140 that allows monitoring device 140 to remotely manage field asset 105. For example, when a corrective sequence is initiated by a user from any of the aforementioned remote devices and subsequently transmitted to monitoring device 140 via NOC 120, such management software may be employed to interpret the corrective sequence and to direct controller board 210 of field asset 105 such that the operation desired by the corrective sequence is effected.

Preferably included in the remote management functionality of the present invention is the ability to update one or more programs, such as device drivers, of instructions on monitoring device 140. Accordingly, monitoring device 140 may also be operable to receive software updates via wireless network 115.

Serial interface 235 is preferably included in monitoring device 140 operably coupled to CPU 225 and memory 230. Serial interface 235 enables monitoring device 140 to monitor and control field asset 105 by enabling monitoring device 140 to communicate with controller board 210 via serial I/O 215 included in diagnostic module 205. Although a serial connection between monitoring device 140 and diagnostic module 205 is discussed herein, other communications technologies may be employed to effect the desired exchange of information. Examples of such communications technologies include, but are not limited to, RS-232, Universal Serial Bus (USB), IEEE 1394 or "Fire Wire," and Ethernet.

Wireless network interface 240, operably coupled to CPU 225 and memory 230, is also preferably included in the hardware configuration of monitoring device 140 depicted in FIG. 2. Wireless network interface 240 is included in the hardware configuration of monitoring device 140 of FIG. 2 to enable monitoring device 140 to communicate with NOC 120 via wireless network 115. Wireless network interface 240 may also allow monitoring device 140 to communicate with one or more devices connected to Internet 110 through NOC 120 using wireless network 115. Preferably, the remote device used is capable of both receiving information sent by NOC 120 and sending information to NOC 120 via Internet 110. In one embodiment, ReFLEX25 and ReFLEX50 by Motorola may be employed as a wireless technology solution.

As mentioned above, NOC 120 is preferably operable to manage and control field asset 105 through monitoring device 140. As such, NOC 120 may be configured with the communications software, database software, etc., necessary to effect such operation. To that end, NOC 120 is preferably operable to provide an Internet-based management application to be used to remotely interact with the field asset 105 via monitoring device 140. Such an Internet-based management application is preferably accessible via Internet 110 using computer 145, PDA 150, mobile phone 155, two-way pager 160, etc., and preferably supports such Internet-based protocols as HTTP, SSL and XML.

Functionality preferably included in the Internet-based management application might include access to a listing of alerts that have been resolved, alerts that have not been resolved, details regarding alerts on selected field assets 105, periodic reports on monitored characteristics of field asset 105, as well as other field asset 105 variables. To the end of interactivity, the Internet-based management application is preferably further capable of remotely controlling computing component 110 via monitoring device 140. For example, a user may want to issue a maintenance command to field asset 105 in an attempt to resolve one of the alerts that has yet to be resolved. Similarly, a user may want to further investigate the source of an unresolved alert by issuing a command to monitoring device 140 that further interrogates field asset 105 in an effort to pinpoint the source of the error condition for the user. The Internet based management application may also allow a user to send software updates to monitoring device 140. More detail regarding Internet access to field asset 105 status and control will be discussed below in association with FIG. 6.

Figure 3:
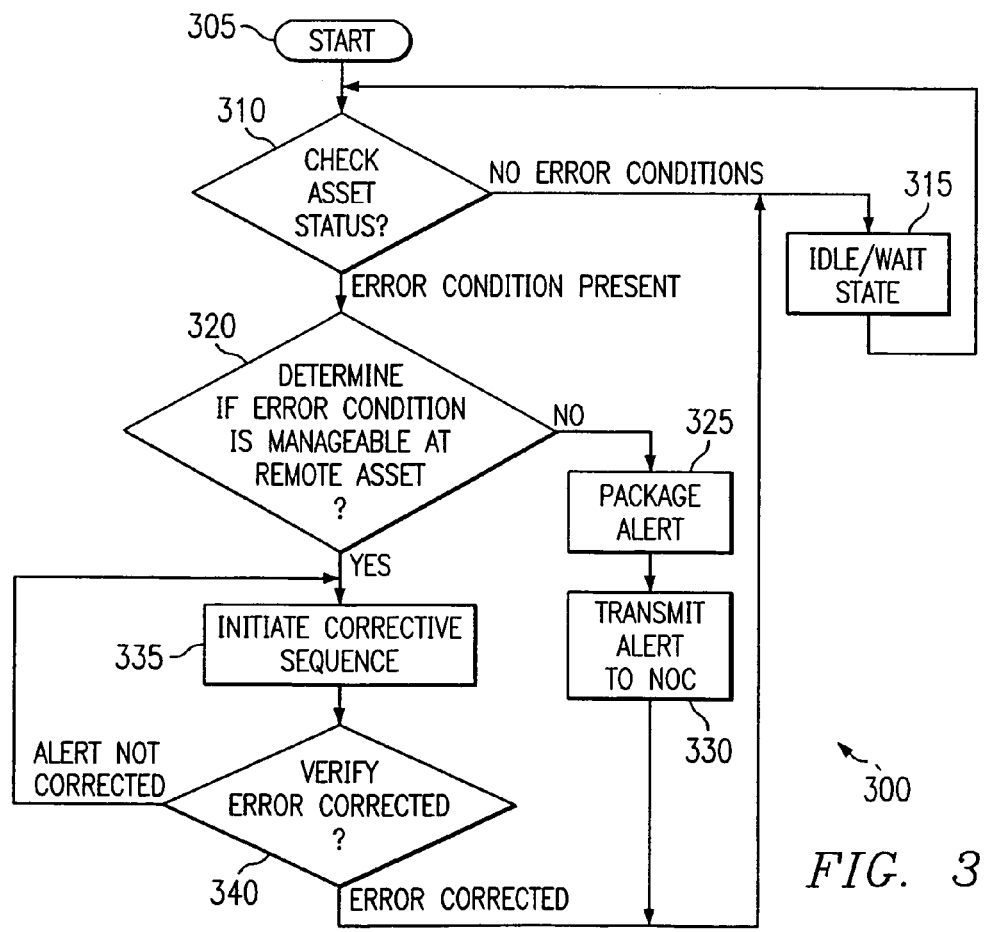
FIG. 3 is a flow diagram illustrating a method for monitoring the occurrence of error conditions on a field asset according to teachings of the present invention.

FIG. 3 is a flow diagram illustrating a method for monitoring the occurrence of error conditions on a field asset 105 according to teachings of the present invention. Accordingly, method 300 of FIG. 3 is one embodiment of a program of instructions that may be incorporated into monitoring device 140.

Upon initiation at 305, method 300 preferably proceeds to 310 where the current status of field asset 105 is checked. If at 310 no error conditions are detected or reported, method 300 preferably proceeds to 315. At 315, method 300 preferably remains in a wait or idle state until the next time period expires before initiation of another field asset 105 status check is to begin at 310.

If at 310 one or more error conditions are detected or reported, method 300 preferably proceeds to 320. At 320, method 300 preferably determines whether the detected error condition may be corrected by software included on monitoring device 140 or field asset 105. If at 320 it is determined that the error condition cannot be corrected by monitoring device 140, method 300 preferably proceeds to 325. At 325, the error condition is preferably packaged into an alert message to be transmitted to NOC 120. The alert message may include such information as the priority of the error condition, field asset 105 identification information, the specific error condition, as well as other telemetry information.

Once the message has been formatted, packaged and otherwise prepared for transmission, method 300 preferably proceeds to 330 where the alert is transmitted to NOC 120 via wireless network 115. Upon transmission of the alert at 330, method 300 preferably proceeds to 315 to assume the wait state.

If at 320 it is determined that the error condition can be addressed and corrected by software included in memory 230 of monitoring device 140, method 300 preferably proceeds to 335. At 335, a sequence of instructions designed to correct the error condition may be executed by monitoring device 140. Upon execution of the appropriate sequence of instructions at 335, method 300 preferably proceeds to 340.

At 340, the effectiveness of the corrective sequence of instructions is determined. If the corrective sequence of instructions is determined to have been ineffective, i.e., the error condition is still present, method 300 preferably returns to 335 for either a repeat of the sequence of corrective instructions or selection of an alternate sequence of instructions. A limit may be implemented on the number of loops allowed to occur at 340 before method 300 is forced to proceed to step 325 where the error condition is packaged and subsequently transmitted to NOC 120. Once the error condition has been corrected or the number of attempts to solve the error condition have been exhausted, method 300 preferably proceeds to 315 to await the next field asset 105 status check.

As mentioned above, field asset 105 may be configured to provide monitoring device 140 with real-time notification upon detection of an error condition. In such an embodiment, method 300 may be altered to accommodate this error condition detection difference while maintaining the ability to accomplish teachings of the present invention.

Referring now to FIG. 4, a flow diagram illustrating a method for updating a field asset status database incorporating teachings of the present invention is shown. Method 400 of FIG. 4 is preferably running in an idle state at 405 on one or more servers 125 at NOC 120. Method 400 preferably remains at 405 until an incoming alert is indicated by communications server 135. Upon leaving idle state at 405, method 400 preferably proceeds to 410. At 410, method 400 may receive the alert transmitted from field asset 105.

At 410, the alert is preferably parsed, decoded, decompressed or otherwise prepared for use by NOC 120. Once the alert has been prepared for use by NOC 120 at 410, method 400 preferably proceeds to 415.

At 415, one or more databases on storage devices 130 may be updated to reflect the new error condition on field asset 105. Depending upon the error condition and upon user preference settings, a user alert, such as an automatic page or other electronic message, may be generated in response to certain error conditions detected on field asset 105. For example, a user may wish to be immediately notified in the event of a complete failure of field asset 105. As will be discussed in greater detail below, database entries associated with error conditions detected on individual field assets 105 are used by NOC 120 to display to users accessing the status of field assets 105 via one or more Internet-enabled devices. Once method 400 has alerted a user where requested at 420, method 400 preferably proceeds to 405 where another alert message is awaited.

Referring now to FIG. 5, a flow diagram illustrating a general method for presenting a web page containing field asset 105 error conditions to an authorized user, according to teachings of the present invention, is shown. Method 500 of FIG. 5 preferably remains running on server 125 in an idle state at 505. Upon receiving a request from a user for access to field asset 105 status information, method 500 preferably proceeds to 510.

At 510, method 500 preferably authenticates the user's identity. Authentication of users may be performed using a variety of authentication techniques, i.e., requesting a username and password for comparison with information stored on one or more storage devices 130, as well as by other methods used by Internet websites to authorize users.

Once the user has been authenticated at 510, a web page listing the authorized user's field assets 105 may be presented. As will be discussed in greater detail below, the user's field assets 105 may be formatted for display on an Internet-enabled remote device such as computer 145, PDA 150, mobile phone 155 or pager 160.

From the listing of the authorized user's field assets 105 displayed at 515, the user may select one or more field asset links to view the details associated with that particular field asset's 105 status at 520. Once the user is presented with the details regarding the error conditions detected at the selected field assets 105, the user has the option to initiate one or more control instructions to be transmitted to and/or executed at the field asset 105. Once a user has selected to transmit one or more control instructions from NOC 120 to field asset 105, the transmission and initiation of the corrective sequence is performed at 525.

Once the corrective sequence has been transmitted to the selected field asset 105, method 500 preferably proceeds to 530 where the effectiveness of the corrective sequence is evaluated. Upon the determination that the error condition has been corrected and no longer exists, method 500 preferably proceeds to 535. At 535, the database containing entries indicative of the status of the repaired field asset 105 is preferably updated to reflect the corrected error condition. Method 500 may then proceed to 505 where another user is awaited or to 515 for a redisplay of the user's field assets 105. If at 530 the error condition is determined to still exist, method 500 preferably proceeds to 520 where the user is again allowed to select a corrective sequence for transmission and execution by field asset 105.

Figure 6A:
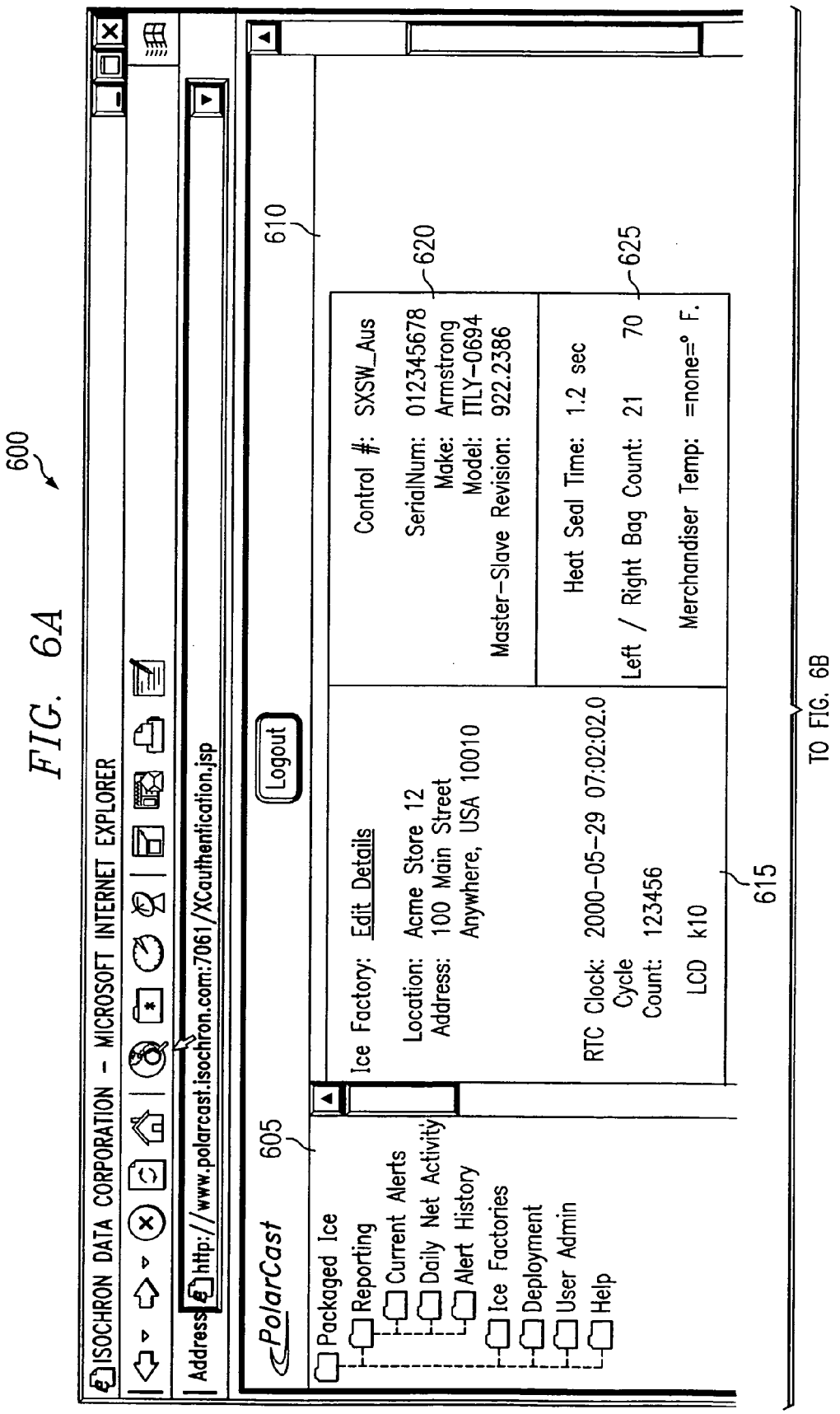
FIG. 6 is a schematic drawing illustrating one embodiment of an Internet-based presentation of a field asset's detailed status according to teachings of the present invention.
Figure 6B:
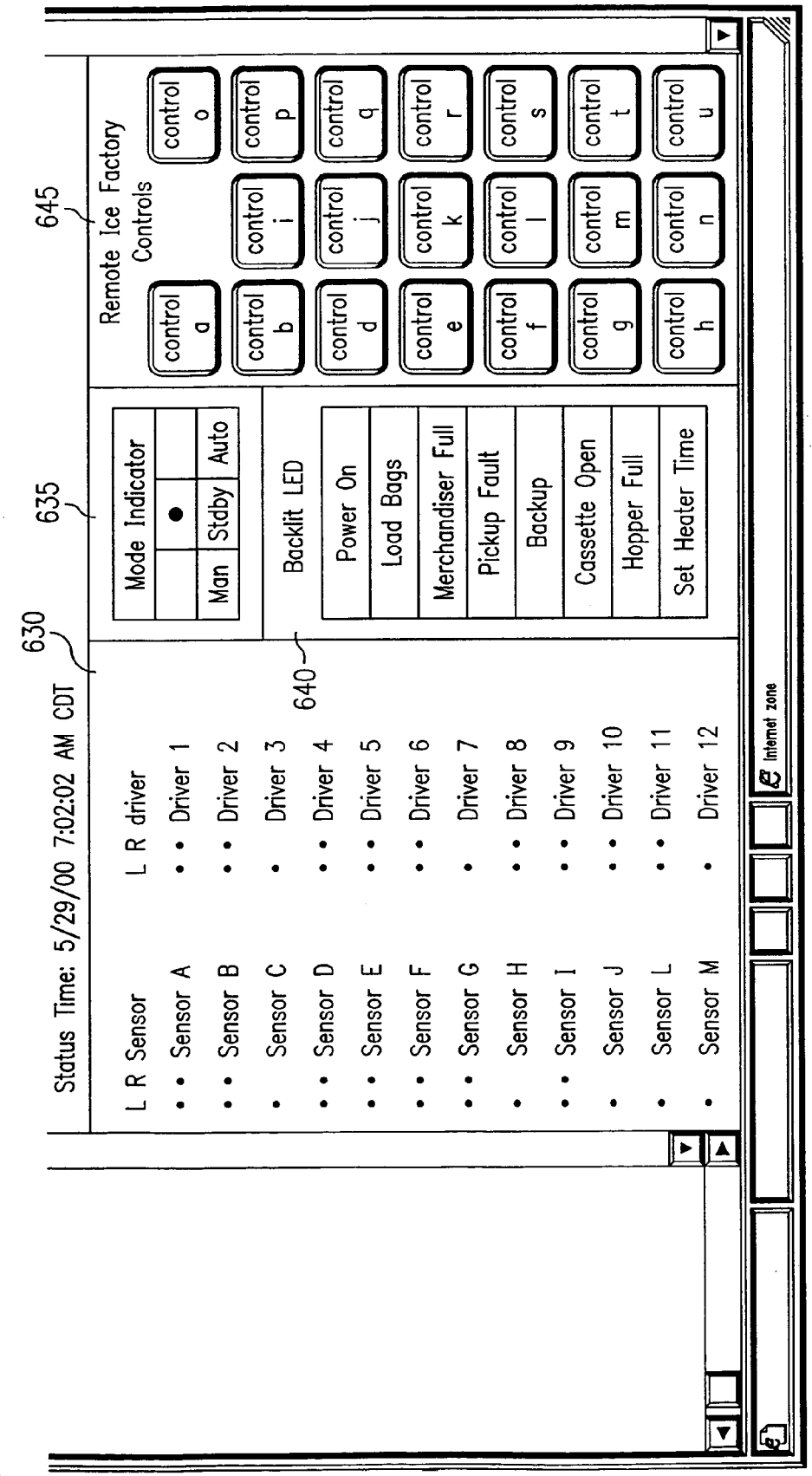

FIG. 6 is a schematic drawing illustrating one embodiment of a web page displaying a field asset's detailed status according to teachings of the present invention. Illustrated in web page 600 are a variety of characteristics and controls associated with field asset 105.

In frame 605 of web page 600, a listing of an authorized user's field asset 105 links is preferably displayed. From the field asset link listing in frame 605, an authorized user is capable of monitoring and controlling each of the enumerated field assets 105 contained therein. Upon selection of a specific field asset link, the user is preferably presented with frame 610.

Preferably included in the field asset 105 detail of frame 610 is field asset 105 identification information 615. Identification information 615 may include such information as the type of field asset 105, i.e., vending machine, ice bagging machine, etc., physical location of field asset 105 as well as other information. As indicated at 620 of web page 600, field asset 105 information such as serial number, make and model, may also be displayed to the user. At 625, current characteristics, such as operating temperature and inventory count, of field asset 105 may also be displayed in frame 610.

In order to enable a user to remotely manage and monitor field asset 105, a display similar to that available to a service technician at the field asset 105 location may also be provided in frame 610. Accordingly, LED display 630 is preferably included in frame 610. LED display 630 preferably simulates the LED display the technician would see if the technician were physically present at field asset 105. Similarly, mode indicator 635 and additional information display 640 are also preferably included in web page 600. Each field asset 105 characteristic that is monitored by monitoring device 140 or diagnostic module 205 is preferably made available to a user on web page 600.

As mentioned above, a variety of control instructions may be needed to correct error conditions on field asset 105. To effect remote correction of an error condition on field asset 105, control panel or control options display 645 is preferably included in web page 600. Control options display 645 preferably includes the control options typically available to a technician physically present at field asset 105. Additional control options may also be included in control options display 645 to provide the user with greater control over field asset 105.

Web page 600 also preferably enables a user to address a variety of error conditions that may arise at field asset 105. By interpreting LED display 630, mode indicator 635, etc., the user may evaluate and determine the current error condition on field asset 105. Once an error condition has been identified and determined to be remotely addressable, the user may then select one or more control options from control options display 645 to correct the current error condition. The control options may be selected by a user from one of the aforementioned remote devices. Once a selection is made, NOC 120 transmits the instruction to monitoring device 140 as described above with reference to FIG. 5. As described above, once an error condition has been corrected, web page 600 may be updated to reflect the corrected status of field asset 105.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A field asset operable as a vending machine, comprising:
   an embedded monitoring device within the field asset, the monitoring device having at least one processor, memory operably coupled to the at least one processor, and a wireless network interface;
   a diagnostic module operably coupled to the monitoring device;
   the diagnostic module operable to monitor at least one characteristic of the field asset for an error condition;
   the monitoring device operable to determine if the error condition is manageable at the field asset; and
   the wireless network interface operable to receive commands from a network operations center transmitted via the wireless network, said commands operable to correct at least one error condition at the field asset.

2. The field asset of claim 1 further comprising:
   a program of instructions storable in the memory and executable in the processor; and
   the program of instructions operable to instruct a vending machine controller board to test at least one vending machine hardware component.

3. The field asset of claim 2 further comprising the program of instructions operable to correct at least one vending machine error condition identified by the controller board.

4. The field asset of claim 2 further comprising the program of instructions operable to package uncorrected error conditions for transmission to the Network Operations Center.

5. The field asset of claim 1 further comprising:
   a program of instructions storable in the memory and executable in the processor; and
   the program of instructions operable to poll a vending machine controller board to determine whether an error condition exists on the vending machine.

6. The field asset of claim 1 further comprising the vending machine including hardware operable to perform ice bagging and vending operations.

7. The field asset of claim 1 further comprising:
   the wireless network interface operable to receive at least one command from an Internet-enabled remote device; and
   the at least one command operable to correct at least one uncorrected error condition existing on the vending machine.

8. The field asset of claim 1 further comprising:
   at least one sensor operably coupled to the memory and the processor; and
   the at least one sensor operable to evaluate at least one characteristic of the vending machine.

9. The field asset of claim 1, wherein the embedded monitoring device lacks means for local user interaction.

10. The field asset of claim 1, wherein the monitoring device further comprises at least one sensor to monitor a characteristic of the field asset not monitored by the diagnostic module.

11. The field asset of claim 1, wherein the monitoring device is operable to maintain a field asset web page accessible to the network operations center.

12. The field asset of claim 11, wherein the field asset web page includes an LED display portion simulating one or more LEDs that are on the field asset.

13. A system for the Internet enabled management of a field asset comprising:
    a field asset having a controller board operable to detect at least one error condition present on the field asset;
    a monitoring device operably coupled to the field asset, the monitoring device including a processor, a memory operably coupled to the processor, and a wireless network interface operably coupled to the memory and the processor and operable to communicate with a wireless network;
    a program of instructions storable in the memory and executable by the processor;
    the program of instructions operable to instruct the controller board to test at least one hardware component at the field asset;
    the monitoring device operable to determine if an error condition in the at least one hardware component is manageable at the field asset;
    the monitoring device operable to generate a field asset web page indicative of a status of the field asset;
    the wireless network interface operable to receive commands from a network operations center transmitted via the wireless network;
    a network operations center operably coupled to the wireless network; and
    the network operations center operable to:
      receive alerts indicative of error conditions existing on the field asset from the monitoring device;
      transmit a command via the wireless network in response to a selected error condition, the command operable to correct the selected error condition on the field asset; and
      retrieve the field asset web page from the monitoring device.

14. The system of claim 13 further comprising a diagnostic module operably coupled to the memory and the processor and operable to monitor at least one characteristic of an associated vending machine.

15. The system of claim 13 further comprising the program of instructions operable to correct at least one vending machine error condition identified by the controller board.

16. The system of claim 13 further comprising the program of instructions operable to package uncorrected error conditions for transmission to network operations center.

17. The system of claim 13 further comprising the network operations center operable to display at least one entry indicative of an error condition existing on the field asset on an Internet-enabled remote device.

18. The system of claim 17 further comprising the network operations center operable to communicate one or more control functions to the field asset in response to selection by a user from the remote device.

19. The system of claim 13, wherein the field asset web page includes an LED display portion indicative of one or more LEDs located on the field asset.

20. A method for monitoring the operating status of a field asset operable as a vending machine, comprising:
  coupling at least one monitoring device to a controller board of the field asset;
  determining, by the monitoring device, whether at least one error condition is present at the field asset;
  maintaining, by the monitoring device, a field asset web page indicative of a status of the field asset;
  determining, by the monitoring device, whether the at least one error condition is manageable at the field asset;
  transmitting the at least one error condition to a network operations center over a wireless network if the at least one error condition is not manageable at the field asset; and
  transmitting a command from the network operations center via the wireless network to correct the at least one error condition at the field asset.

21. The method of claim 20 further comprising polling, by the monitoring device, the field asset to determine whether at least one error condition is present on the field asset.

22. The method of claim 20 further comprising:
  receiving, at the network operations center, the transmitted error conditions; and
  updating an Internet accessible database such that a technician can review at least one field asset for the presence of error conditions.

* * * * *